United States Patent
Lücke et al.

(10) Patent No.: US 11,873,944 B2
(45) Date of Patent: Jan. 16, 2024

(54) TUBULAR ELEMENT FOR GAS PRESSURE VESSEL, GAS PRESSURE VESSEL AND METHOD OF MANUFACTURING A TUBULAR ELEMENT

(71) Applicant: Benteler Steel/Tube GmbH, Paderborn (DE)

(72) Inventors: Daniel Lücke, Paderborn (DE);
Michael Markert, Lichtenau (DE);
Dirk Tegethoff, Salzkotten (DE);
Marcel Wellpott, Paderborn (DE)

(73) Assignee: Benteler Steel/Tube GmbH

( * ) Notice: Subject to any disclaimer, the term of this patent is extended or adjusted under 35 U.S.C. 154(b) by 904 days.

(21) Appl. No.: 16/577,725

(22) Filed: Sep. 20, 2019

(65) Prior Publication Data
US 2020/0094773 A1   Mar. 26, 2020

(30) Foreign Application Priority Data
Sep. 21, 2018   (DE) ............... 10 2018 123 316.7

(51) Int. Cl.
*B21C 1/24* (2006.01)
*B21C 37/16* (2006.01)
(Continued)

(52) U.S. Cl.
CPC ............ *F16L 9/006* (2013.01); *B21C 1/24* (2013.01); *B60R 21/26* (2013.01); *B21C 37/16* (2013.01);
(Continued)

(58) Field of Classification Search
CPC .... B21C 1/24; B21C 1/22; B21C 1/18; B21C 1/16; B21C 37/16; B21C 37/15; B21C 3/16; B21D 41/00
See application file for complete search history.

(56) References Cited

U.S. PATENT DOCUMENTS 3,517,536 A * 6/1970 Fitzmaurice .......... B21C 37/202
72/340
2003/0098572 A1   5/2003 Katsuda et al.
(Continued)

FOREIGN PATENT DOCUMENTS

CN   203477638   3/2014
CN   106232837   12/2016
(Continued)

*Primary Examiner* — Teresa M Ekiert
(74) *Attorney, Agent, or Firm* — Pandiscio & Pandiscio (57) ABSTRACT

This invention concerns a tubular element for a gas pressure vessel of an airbag module, in particular of a vehicle, wherein the tubular element (1) consists of high-strength steel, has a first and a second end (17, 18) and from the first end (17) to the second end (18) the tubular element (1) has an undeformed section (11), a transition section (12) and a tapering section (13) and on the tapering section (13) at least one radially outwardly extending collar (14) is formed, characterized in that the collar (14) is separated from the transition section (12) by a first length section (130) having an outer diameter (A1) smaller than the outer diameter (A2) of the collar (14) and the wall thickness of the collar (14) is greater than the wall thickness of the first length section (130). Furthermore, the invention concerns a gas pressure vessel and a process for manufacturing a tubular element according to the invention (1).

15 Claims, 4 Drawing Sheets

(51) Int. Cl.
*B21D 41/00* (2006.01)
*F16L 9/00* (2006.01)
*B60R 21/26* (2011.01)

(52) U.S. Cl.
CPC .... *B21D 41/00* (2013.01); *B60R 2021/26076* (2013.01); *B60R 2021/26082* (2013.01)

(56) References Cited

U.S. PATENT DOCUMENTS

2007/0129154 A1* 6/2007 Valovick ................ B21K 1/063
464/170
2015/0053697 A1 2/2015 Lang et al.

FOREIGN PATENT DOCUMENTS

| | | |
|---|---|---|
| CN | 106881439 | 6/2017 |
| EP | 1704944 | 9/2006 |
| EP | 1702695 | 12/2009 |
| JP | H 02187230 | 7/1990 |

* cited by examiner

TUBULAR ELEMENT FOR GAS PRESSURE VESSEL, GAS PRESSURE VESSEL AND METHOD OF MANUFACTURING A TUBULAR ELEMENT

REFERENCE TO PENDING PRIOR PATENT APPLICATION

This patent application claims benefit of German Patent Application No. DE 10 2018 123 316.7, filed Sep. 21, 2018, which patent application is hereby incorporated herein by reference.

FIELD OF THE INVENTION

The present invention relates to a tubular element for a gas pressure vessel, in particular for an airbag module, to a gas pressure vessel and to a process for manufacturing such a tubular element.

BACKGROUND OF THE INVENTION

In a system subjected to high pressure, such as for example an airbag system of a motor vehicle, it is necessary to use tubular elements capable of withstanding this pressure. In airbag systems or airbag modules, for example, gas pressure vessels must be used, which form the housing of the gas generator and/or the reaction chamber, for example. In particular, these gas pressure vessels and the tubular element that forms the gas generator must be able to withstand high internal pressure load.

For this reason it is known to use high-strength materials for tubular elements for gas pressure vessels. At the same time, however, the tubular element must have geometries that allow, for example, the attachment or installation of further components. For this purpose, for example, the tubular elements may have recesses on the circumference of the tubular element. However, safe operation of the gas pressure vessel requires that it does not fail despite the geometry which it has been provided with. For providing such geometries at the tube end, the tubular elements are usually treated by hot rolling. This type of forming, however, has the disadvantage that, on the one hand, a long cycle time is required and, on the other hand, that hot rolling must take place at high temperatures, which leads to scaling of the surface during the forming process.

A general forming method for forming of a hollow component is disclosed in EP 1 702 695 B1, for example. In that document a process is described in which, in a first process step, a wall thickening is produced in a forming area by means of plastic material forming, in particular by hot and/or semi-hot forming and in a second process step, a transition is formed in the forming area by means of plastic material forming, through which a first section with a larger transverse extension and of a second section with a smaller transverse extension are formed. In the first process step, the hollow component is upset, that means compressed, in such a way that in the forming area a wall thickening results with a wall of the hollow component that is enlarged both outwards and inwards.

This method has the disadvantage that the transition must be formed in the area that was previously formed with a wall thickening. This process step must therefore be carried out at high temperatures, especially when a material of high strength is used, whereby a renewed risk of scaling of the surface occurs.

SUMMARY OF THE INVENTION

The invention is therefore based on the problem of creating a solution with which the required geometries can be easily formed at a high-strength tubular element.

The invention is based on the finding that this problem can be solved by dividing the forming process into suitable process steps.

According to a first aspect, the invention therefore relates to a tubular element for a gas pressure vessel of an airbag module, in particular of a motor vehicle, wherein the tubular element consists of high-strength steel, has a first and a second end, and from the first end to the second end the tubular element has an undeformed section, a transition section and a tapering section, and at least one radially outwardly extending protrusion is formed on the tapering section. The tubular element is characterized in that the protrusion is separated from the transition section by a first length section having an outer diameter smaller than the outer diameter of the protrusion, and the wall thickness of the protrusion is larger than the wall thickness of the first length section. The protrusion can also be referred to as collar.

The tubular element is a tubular element for a gas pressure vessel of an airbag module, in particular of a motor vehicle. The tubular element can therefore also be referred to as an airbag tube. In particular, the tubular element in the airbag module can be used as the housing of the gas generator. The tubular element consists of high-strength steel. The term high-strength steel is preferably used to describe steel with a tensile strength in the range of 800-1500 MPa, in particular 900-1200 MPa. The tubular element has a first end and an opposite second end. From the first end an undeformed section extends in the longitudinal direction of the tubular element. An undeformed section is defined as a section in which the diameter and wall thickness of the tubular element essentially correspond to the diameter and wall thickness of the tube from which the tubular element is made. The transition section follows the undeformed section in the longitudinal direction. A transition section is a length section of the tubular element in which the diameter decreases from the outer diameter of the tube from which the tubular element is made to the largest outer diameter of the tapering section, in particular a first length section of the tapering section. Preferably, the inner diameter in the transition section will also decrease. The decrease of the outer diameter is preferably a continuous decrease and the transition from the transition section to the tapering section preferably has a curvature radius. Also the decrease of the inner diameter is preferably continuous over the largest part of the length of the transition section. However, the reduction of the inner diameter may end before the end of the transition section, i.e. before the end of the decrease of the outer diameter. Thus, in the end area of the transition section, followed by the first length of the tapering section, the inner diameter of the tubular element can be constant, while the outer diameter continues to decrease. This allows a step to be formed inside the tubular element and in particular in the transition section.

The transition section is followed by a tapering section in the direction towards the second end of the tubular element. The tapering section is the length section between the transition section and the second end of the tubular element. In this tapering section, the inner diameter is smaller than the inner diameter of the undeformed section and the transition section. The inner diameter of the tapering section may be constant over the length of the tapering section, decrease and/or increase at the second end of the tubular element.

At the tapering section, at least one radially outwardly extending protrusion is formed. The protrusion extends over the entire outer circumference of the tubular element and is also referred to as a collar.

The tubular element is characterized in that the protrusion is separated from the transition portion by a first length section. The first length section is a part of the tapering section and has an outer diameter smaller than the outer diameter of the protrusion. The wall thickness of the protrusion is larger than the wall thickness of the first length section. The protrusion can also be referred to as undercut.

By having a radially outwardly extending collar separated from the transition section by a first length section having an outer diameter smaller than the outer diameter of the collar, and the wall thickness of the collar being larger than the wall thickness of the first length section, a number of advantages can be achieved. On the one hand, the increased wall thickness in the area of the collar can prevent the failure of the tubular element also in this area, which can occur in particular at high pressures which prevail, for example, in a gas pressure vessel of an airbag module, in particular of a motor vehicle, when a smaller wall thickness in the area of the collar is used. In addition, since the collar is at a distance from the transition section, a recess is formed, by means of which further components of the airbag module or components for filling the gas pressure vessel are reliably attached.

In a preferred embodiment, the tubular element is manufactured by at least an axial semi-hot forming process. In particular, the forming process includes the axial semi-hot compression of the tubular element, which can also be referred to as axial semi-hot upsetting. The additional advantage which can be achieved by using semi-hot forming is that the material of the tube from which the tubular element is made is formed at a temperature above room temperature, thus reducing the force required for forming. In addition, during semi-hot forming, scaling of preferably used high-strength steel during forming can be reduced or prevented. As a result, reworking of the tubular element is not necessary, or is only necessary in certain areas. In addition, since forming is preferably an axial compression or upsetting, the material is not exposed to tensile stress in the collar area, unlike when hot rolling is being used, and is therefore more robust.

A further advantage resulting from semi-hot forming, in particular of forming at temperatures lower than the Ac3 temperature of the material of the tubular element, is a low or no scale formation. In addition, these forming temperatures do not lead to decarburization of the tubular element's edges. Furthermore, there is no cooling distortion at these temperatures and the tubular element can be machined well by metal-cutting. Especially in the area of the tubular element where it may have to be tightly connected to another component, the sealing surface is in gauge. Finally, there is an improved current integration during resistance welding. In particular, pitting, i.e. the breaking out of pieces of material, in particular shell-shaped pieces of material, can be prevented and electrode wear is reduced.

The tubular element is preferably made of heat-treated steel with a tensile strength of 800 to 1500 MPa, preferably 900 to 1200 MPa. This material enables the tubular element to withstand particularly well the stresses to which a tubular element is exposed as a gas pressure vessel in an airbag module.

In a preferred embodiment, the surface of the tubular element in the tapering section is only partially machined after the axial semi-hot forming process. For example, the surface can be machined by milling. Especially by milling in the area of the collar, the contour of the collar can be adapted to the requirements of attaching and fastening further components. In addition or alternatively, a cylindrical recess can be made at the inside of the tubular element, particularly in the area of the second end of the tubular element. This recess can also be used to insert further components of an airbag module. As an alternative to milling, a different metal-cutting or also a rolling or kneading processing can be carried out.

In another embodiment, the tapering portion has a second length section extending from the second end of the tubular element to the collar and the second length section of the tapering portion has a smaller inner diameter than the first length section. Alternatively, the inner diameter of the second length section may be equal to the inner diameter of the first length section. In addition, the second length section has a smaller outer diameter than the first length section. Alternatively, the outer diameter of the second length section can also be equal to the outer diameter of the first length section.

In another embodiment, the inside of the second length section has a cylindrical recess extending to the second end of the tubular element.

In another aspect, the invention concerns a gas pressure vessel for an airbag module. The gas pressure vessel is characterized in that it has a tubular element according to the invention.

The gas pressure vessel of an airbag module of a motor vehicle is preferably the housing of a gas generator of an airbag module of a motor vehicle. Gas is stored or produced in the gas pressure vessel. In addition, gas is released from the gas pressure vessel at high speed. The gas generator then fills the airbag with gas. The gas generator can be a cold gas generator or a hybrid gas generator. In these gas generators, at least one tubular element is provided, which serves in particular as a compressed gas reservoir and/or expansion chamber for gas. The tubular element can, for example, represent the housing of an airbag generator. A large force acts spontaneously on these tubular elements, which force the material of the tubular element must withstand in order to prevent the tubular element from bursting. A cold gas generator consists of a gas storage vessel, in which gas is stored at high pressure, and an activator. The gas storage vessel is closed by a membrane. When the gas generator is triggered, the membrane is destroyed, in particular by an explosive device, and the gas can flow out of the gas storage vessel. Alternatively, the inventive gas generator can also be a hybrid gas generator. This is a combination of a pyrotechnic generator and a cold gas generator. With a hybrid gas generator, in addition to the pressure vessel for the gas, a pyrotechnic module for gas generation is also provided.

According to a further aspect, the present invention concerns a process for the manufacturing of a tubular element according to the invention. The process is characterized in that the tubular element is produced in several stages and comprises at least one semi-hot forming process step which is carried out as axial compression.

The advantages and characteristics described with regard to the tubular element and the gas pressure vessel, in particular the gas generator, also apply—where applicable—to the process in accordance with the invention and vice versa.

The process can, for example, comprise three semi-hot forming process steps. By manufacturing the tubular element in multiple stages, the tube can be formed at lower temperatures than those used for hot forming, despite the preferred use of high-strength steel. In particular, this can prevent or reduce scaling of the tube material during forming. Nevertheless, by dividing the process, the force per process step is small. Finally, by splitting the process into the individual process steps, different tools can be used which are designed for the geometry of the tubular element to be set. As the process additionally includes a semi-hot forming process step which is carried out as axial compression, the shaping can be achieved by applying pressure to the tubular element and therefore the expected tensile stresses of the known rolling process cannot occur.

In a preferred embodiment, the procedure includes the following steps:
- a first step of drawing-in a tube end of a tube to the inner diameter of the collar,
- a second step of axial compression of the collar
- a third step of drawing-in the tube end to a final diameter and final shaping the collar.

The first step of drawing-in the end of the tube, which, after forming, forms the tapering section, takes place at the second end of the tube from which the tubular element is made. In particular, drawing-in is carried out using outer tools, in particular an outer die. The second step can, for example, be carried out using a die. In the third step of drawing-in the tube end to a final diameter and forming the collar, the drawing of the tube end and the forming of the collar are preferably done simultaneously. For example, a die can be used.

The at least one process step of semi-hot forming shall preferably be carried out at temperatures in the range 200° C. to 800° C. and below the Ac3 temperature of the steel of which the tubular element consists. The resulting advantages have already been described above with regard to the tubular element. In particular, the force required to form a high-strength steel can be reduced and scale formation can be reduced or prevented. The temperature at which scale formation begins usually depends on the material and increases exponentially above a certain temperature. Especially with steel, scale formation at temperatures below Ac3 does not yet take place or is low. This means that post-treatment of the tubular element, in particular descaling, can be omitted or is at least less time-consuming in the preferred forming process at temperatures below the Ac3 temperature of the steel. It is particularly preferred, that in the respective process step, the tube or pre-formed tubular element is heated to the specified temperatures at least in the area in which the forming takes place in the step.

In an embodiment, in the first process step a tube is compressed by means of an outer die and the wall thickness of the tube is increased at least in the tapering section and the tube length in the tapering section. The outer die can have a through hole which preferably has a cylindrical part on the outlet side and a tapering area on the inlet side. The tapering area of the outer die preferably has a curved surface and thus forms a bowl shape.

In another embodiment, a collar is pre-formed on the outside of the tapering section in the second process step. In addition, in the second process step, the inner form of the transition section can be completely finished. The pre-forming of the collar is understood to mean in particular an increase in the wall thickness in the area of the collar. The wall thickness is increased by axial compression. Preferably the increase of the wall thickness in the area of the collar is performed only towards the outside. The inner diameter is not reduced in the collar area.

In another embodiment, the second process step is performed with a die having a mandrel and an annular gap surrounding the mandrel, the annular gap having a shoulder on the open side in which the width of the annular gap is increased. The mandrel and the annular gap are provided on one side of the die. This side can also be referred to as the top or upper side of the die. The mandrel extends upwards from the top and the annular gap is provided into the top of a die but does not completely penetrate it. The open side of the annular gap is therefore defined as the side of the annular gap which is located in the upper side of the die. From this side, the pre-formed tubular element, which is held in an upper die, is introduced with a part of the tapering section. By moving a second die and the first die towards each other, for example by means of a punch, the mandrel enters the interior of the tapering section. The mandrel has a length greater than the length of the tapering section. The dies are moved towards each other until the second end of the tubular element touches the bottom of the annular gap. By moving the dies further together, an axial force is exerted on the tapering section and the tubular element is compressed in this area. The tapering section material is pressed into the larger-diameter shoulder formed at the annular gap, thereby pre-forming the collar. The tubular element is preferably held in the die so that the undeformed section, the transition section and part of the tapering section are closely surrounded by the die. On the side of the die through which the tapering section emerges from the die, a plunge having a rounded shape is formed on the through hole. This allows the collar to be pre-formed by compression towards the top by means of the plunge.

In another embodiment, in the third step of the process, the collar and the end of the tube are finished by means of a die which has a cup-shaped recess, whose diameter increases towards the open end. The recess is provided on one side of the die: This side can also be referred to as the top or upper side of the die. The recess is located on the upper side of the die, but does not penetrate it completely. The open side of the recess is therefore defined as the side of the recess that is located in the upper side of the die. From this side, the pre-formed tubular element with an already pre-formed collar, which is held in another die, is inserted with a part of the tapering section. In particular, the second length section of the tapering section and the lower part of the collar are inserted into the recess. The depth of the recess is less than the length of the tapering section that extends over the further die. By advancing or moving the dies towards each other, the tapering section is compressed. In particular, the second length section and the collar are compressed by the axial force. Since no internal tool is provided, the wall thickness in the area of the second length section and the collar is increased. The recess preferably has a conical curved surface in the area where the collar is formed. This can create a slope on the outside from the second length section to the highest point of the collar.

In an embodiment, the tubular element is machined in sections of the tapering section after the last axial forming step. For example, a cylindrical recess can be made in the inside of the tapering section by machining the surface. Alternatively or additionally, on the outside of the tapering section, the radius of curvature of the transition between the collar and the second length section can be reduced by milling and/or a forging burr can be milled off from the collar.

BRIEF DESCRIPTION OF THE DRAWINGS

The invention is described in more detail in the following with reference to the enclosed figures, wherein.

DETAILED DESCRIPTION OF THE PREFERRED EMBODIMENTS

Figure 1:
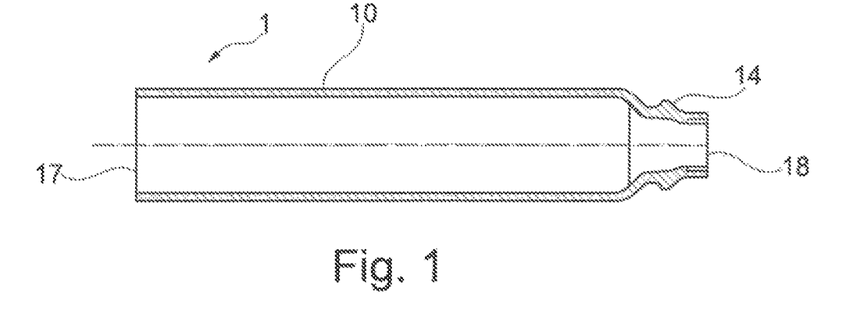
FIG. 1: shows a schematic longitudinal cross-sectional view of an embodiment of the tubular element according to the invention.
Figure 2:
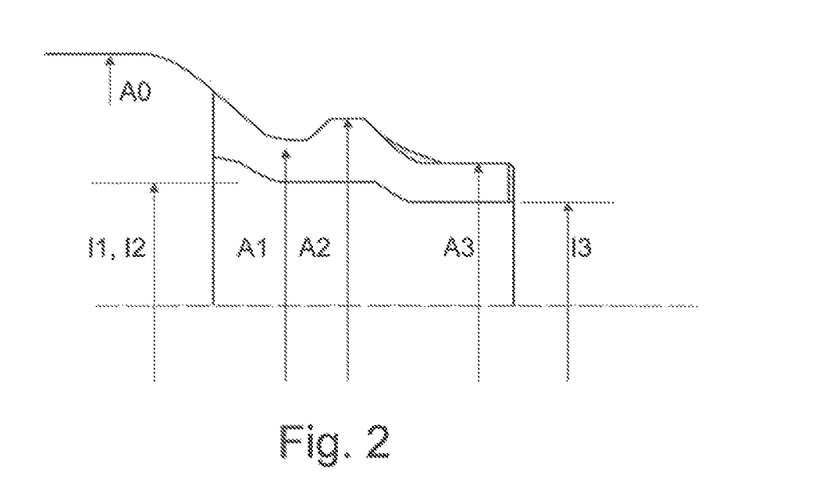
FIG. 2: shows another detailed view of the second end area of the tubular element according to FIG. 1.
Figure 3:
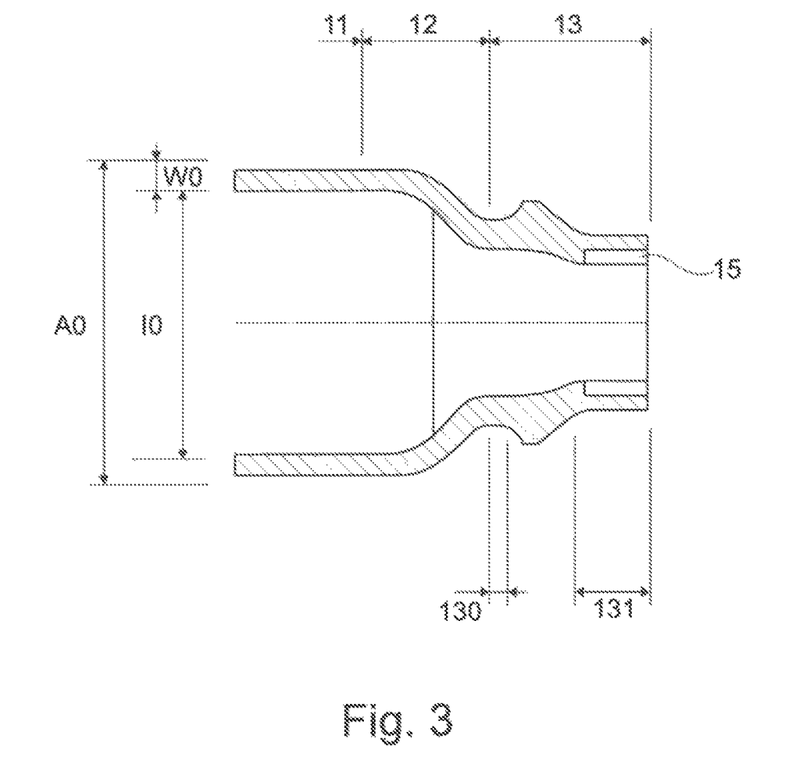
FIG. 3: shows another detailed view of the second end area of the tubular element according to FIG. 1.

FIGS. 1 to 3 show an embodiment of tubular element 1 according to the invention. The tubular element 1 has a first end 17 and a second end 18. The undeformed section 11 of the tubular element 1 extends from the first end 17. The undeformed section 11 is followed by a transition section 12 in which the diameter of the tubular element 1 decreases. The transition section 12 is followed by a tapering section 13 which extends to the second end 18 of the tubular element 1. At the tapering section 13 a collar 14 is formed, which can also be called undercut or flange. The collar 14 is separated from the transition section 12 by a first length section 130 of the tapering section 13. Between the collar 14 and the second end 18 lays a second length 131 of tapering section 13.

In the undeformed section 11, the tubular element 1 has a wall thickness W0.

In the undeformed area 11, tubular element 1 has an inner diameter I0 and an outer diameter A0. In the first length portion 130 of the tapering section 13, the tubular element 10 has an outer diameter A1 which is smaller than the outer diameter A0, and an inner diameter I1 which is smaller than the inner diameter I0. The inner diameter I2 in the region of the collar 14 is equal to the inner diameter I1 of the first length portion 130 in the represented design form. The outer diameter A2 of the collar 14 is larger than the outer diameter A1 and smaller than the outer diameter A0 in the embodiment. The inner diameter I3 of the second length 131 is smaller than the inner diameter I1 and I2. The outer diameter A3 is smaller than the outer diameter A1.

Figure 4:
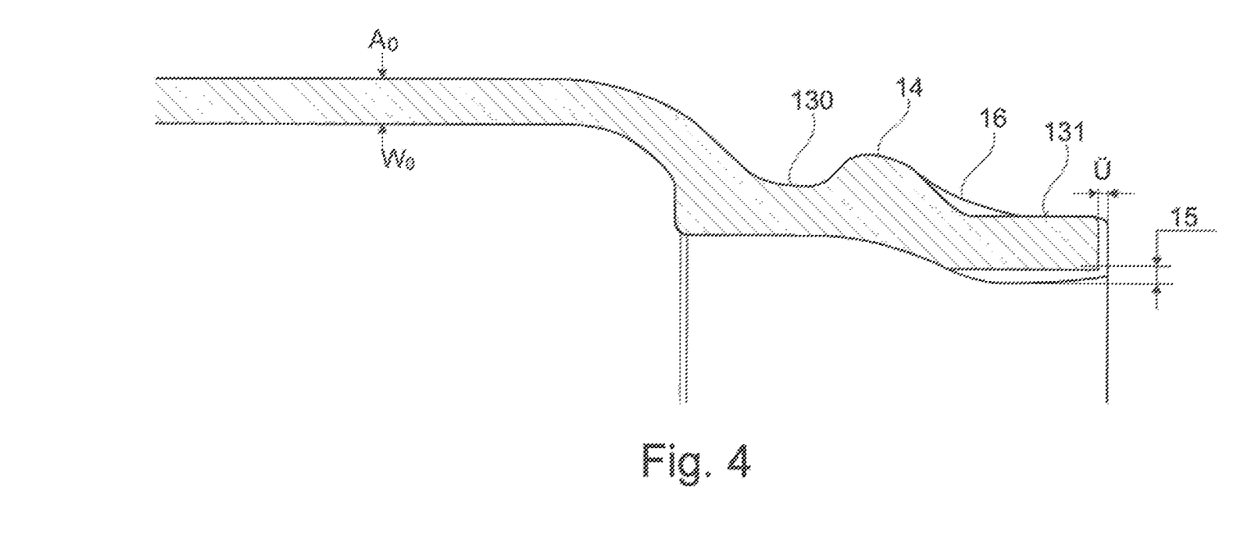
FIG. 4: shows a second end area of the tubular element after a third process step.

FIG. 4 shows the shape of the end section of an embodiment of tubular element 1 according to FIG. 1 after the third forming step. As can be seen from this view, according to the invention, tubular element 1 has a smooth surface inside the transition between first length 130, collar 14 and second length 131, without any bulges. In this way, turbulences can be prevented inside the tubular element according to the invention, which can have a negative effect on the operation of a gas generator.

On the outside of the shown embodiment the slope of the second length section 131 to the collar 14 is small. If a steeper slope is required, the area marked 16 can be removed, e.g. milled. On the inside, a cylindrical recess can be made, e.g. milled, according to the internal milling marked 15 in the tubular element 1 according to the invention.

Any overhang Ü at the second end of tubular element 1 can also be removed by milling or other machining.

Figure 5:
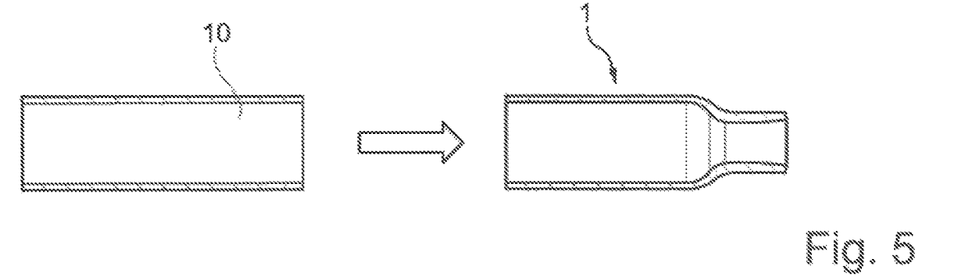
FIG. 5: shows a schematic representation of a first process step of an embodiment of the inventive process.
Figure 6:
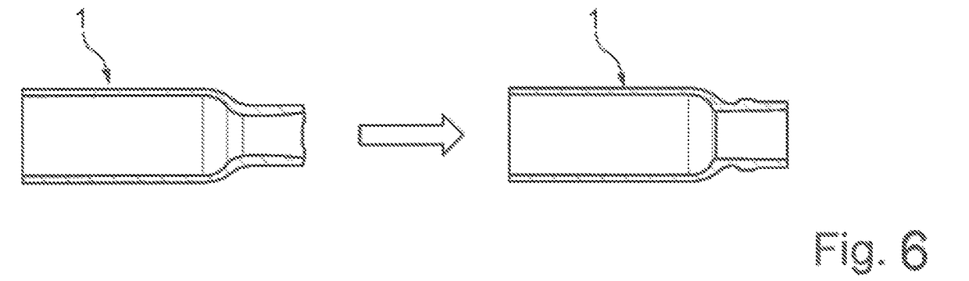
FIG. 6: shows a schematic representation of a second process step of an embodiment of the inventive process.
Figure 7:
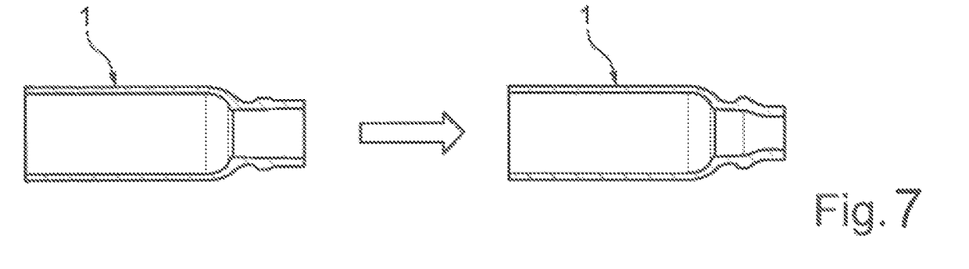
FIG. 7: shows a schematic representation of a third process step of an embodiment of the inventive process.

FIGS. 5 to 7 schematically show the processing steps according to an embodiment of the inventive process. The tools are not shown in these figures.

In a first step, a tube 10 is inserted into a first die which closely surrounds it. The length of the first die is less than the length of the tube 10. An outer die is also provided. The outer die has a through hole. The through hole has a tapering part and an adjoining cylindrical part. The largest diameter of the tapering part is larger than or equal to the diameter of the tube 10. The cylindrical part has a smaller diameter.

The tube 10 is at least partially heated to a higher temperature than the rest of the tube 10 in the area where it overhangs the first die. By moving the first die with the tube towards the outer die, the tube 10 passes into the through hole and is formed. After the first step, the tube 10 thus has the shape shown in FIG. 5 on the right. In particular, the transition section is finished on the outside by the tapering part of the outer die through hole and the smaller diameter tapering section is pre-formed by the cylindrical part. In particular, the wall thickness of the tapering section and its length are increased. Prior to this process step, tube 10, for example, is heated to 700° C. at the part that forms the tapering section, while the rest of the tube is heated to 200° C., for example.

FIG. 6 shows the second step of the process. In this step, the tube 10 pre-formed in step 1 is inserted into a first die. The tube 10 is inserted into the first die so that the undeformed section and the transition section are in the first die. For this purpose, a tapering corresponding to the transition section is provided in the first die. In addition, the first length section of the tapering section lies in the first die and is enclosed by it from the outside. The remaining part of the tapering section extends through a plunge of the first die. A second die used in this step has a mandrel and an annular gap surrounding it. If the first die and the second die are moved towards each other, for example by a punch, the mandrel enters the inside of the tapering section of the pre-formed tubular element 1. The dies are moved towards each other to such an extent that the second end of the tubular element enters the annular gap and touches its base. The depth of the annular gap is less than the length of the overhang of the tapering section over the first die. This results in the shape of the tubular element shown in FIG. 6 at the end of the second step. In this state, the collar is pre-formed and the transition section is finished on the inside. The collar is formed from above by the plunge of the first die and from below by the shoulder of the annular gap.

FIG. 7 schematically shows the third step of the process. The tubular element 1 pre-formed in step 2 is fixed in the first die. A second die is also provided, in which a cup-shaped recess is provided. If this second die is moved towards the first die, the tapering section, in particular the second length section, enters the recess. By moving the dies further together, the tubular element 1 is given the shape shown in FIG. 7 on the right.

After this process step, the tubular element 1 can be machined as described above, for example by milling.

REFERENCE CHARACTER LIST 1 tubular element
10 tube
11 undeformed section
12 transition section
13 tapering section
130 first length section
131 second length section 14 collar
140 forging burr
15 internal milling
16 outside milling
17 first end
18 second end
A0 outer diameter of the outlet
A1 first outer diameter
A2 second outer diameter
A3 third outer diameter
I0 inner diameter of the outlet
I1 first inner diameter
I2 second inner diameter
I3 third inner diameter
W0 output wall thickness

What is claimed is:

1. A process for producing a tubular element (1) for a gas pressure vessel of an airbag module, wherein the tubular element (1) consists of high-strength steel, has a first and a second end (17, 18) and from the first end (17) to the second end (18) the tubular element (1) has an undeformed section (11), a transition section (12) and a tapering section (13), and on the tapering section (13) at least one radially outwardly extending collar (14) is formed, wherein the collar (14) is separated from the transition section (12) by a first length section (130) having an outer diameter (A1) smaller than the outer diameter (A2) of the collar (14) and the wall thickness of the collar (14) is greater than the wall thickness of the first length section (130), characterized in that the tubular element (1) is produced according to a method comprising the following steps:
providing a tube (10) from which the tubular element (1) is to be made;
a first process step of drawing a tube end of the tube (10) to the inner diameter (I1) of the collar (14);
a second process step of forming said collar (14), which second process step is a semi-hot forming process step and is carried out by axial compression; and
a third process step of drawing the tube end to a final diameter (A3) and end forming the collar (14);
wherein in the second process step the collar (14) is pre-formed on the outside of the tapering portion (13);
wherein the second process step is carried out with a die which has a mandrel and an annular gap surrounding the mandrel, the annular gap having on the open side a shoulder in which the width of the annular gap is increased.

2. A process according to claim 1, wherein at least the process step of the axial semi-hot forming is carried out at temperatures in the range of 200° C. to 800° C. and below the Ac3 temperature of the steel of which the tubular element consists.

3. A process according to claim 1, wherein in the first process step, the tube (10) is compressed, and further wherein the wall thickness of the tube (10) at least in the tapering section (13) and the tube length in the tapering section (13) is increased.

4. A process according to claim 1, wherein in the second process step the inner shape of the transition section (12) is completely formed.

5. A process according to claim 1, wherein the tubular element (1) is machined in areas of the tapering section (13) after the third process step.

6. A process according to claim 5, wherein in the inside of the tapering section (13) a cylindrical recess (15) is introduced by machining a surface of the tubular element (1).

7. A process according to claim 1, wherein the tubular element is quenched and tempered prior to the first process step of drawing the tube.

8. A process for producing a tubular element (1) for a gas pressure vessel of an airbag module, wherein the tubular element (1) consists of high-strength steel, has a first and a second end (17, 18) and from the first end (17) to the second end (18) the tubular element (1) has an undeformed section (11), a transition section (12) and a tapering section (13) and on the tapering section (13) at least one radially outwardly extending collar (14) is formed, wherein the collar (14) is separated from the transition section (12) by a first length section (130) having an outer diameter (A1) smaller than the outer diameter (A2) of the collar (14) and the wall thickness of the collar (14) is greater than the wall thickness of the first length section (130), characterized in that the tubular element (1) is produced according to a method comprising the following steps:
providing a tube (10) from which the tubular element (1) is to be made;
a first process step of drawing a tube end of the tube (10) to the inner diameter (I1) of the collar (14);
a second process step of forming said collar (14) which second process step is a semi-hot forming process step and is carried out by axial compression; and
a third process step of drawing the tube end to a final diameter (A3) and end forming the collar (14);
wherein the third process step the collar (14) and the tube end are finished in the area of the second length section (131) by means of a die which has a bowl-shaped recess whose diameter increases towards the open end.

9. A process according to claim 8, wherein the tubular element is quenched and tempered prior to the first process step of drawing the tube.

10. A process according to claim 8, wherein at least the process step of the axial semi-hot forming is carried out at temperatures in the range of 200° C. to 800° C. and below the Ac3 temperature of the steel of which the tubular element consists.

11. A process according to claim 8, wherein the tubular element (1) is machined in areas of the tapering section (13) after the third process step.

12. A process according to claim 11, wherein in the inside of the tapering section (13) a cylindrical recess (15) is introduced by machining a surface of the tubular element (1).

13. A process according to claim 8, wherein in the first process step the tube (10) is compressed, and further wherein the wall thickness of the tube (10) at least in the tapering section (13) and the tube length in the tapering section (13) is increased.

14. A process according to claim 8, wherein in the second process step the collar (14) is pre-formed on the outside of the tapering portion (13).

15. A process according to claim 8, wherein in the second process step the inner shape of the transition section (12) is completely formed.

* * * * *